Patented June 18, 1935

2,004,996

UNITED STATES PATENT OFFICE 2,004,996

PROCESS FOR CONDENSING UREA WITH FORMALDEHYDE OR THE POLYMERIC BODIES THEREOF AND THE PRODUCT OBTAINED THEREFROM

Julien Malet and René Armenault, Paris, France, assignors of one-half to Fabriques de Produits de Chimie Organique de Laire, Societe Anonyme, Issy-les-Moulineaux, France No Drawing. Application December 2, 1929 Serial No. 411,212. In France December 6, 1928

4 Claims. (Cl. 260—3)

Ordinary urea as well as its derivatives can be condensed with formaldehyde or its polymeric bodies, and the reaction can be effected in an alkaline or acid medium. The products of condensation obtained are, however, very different according to the nature of the reagents which instigate their formation for, according to whether one condensation agent or another is used, there is obtained an orientation of the reaction which leads to obtaining products possessing special industrial properties more or less adapted to the applications for which they are destined.

Goldschmidt (Ber. 29 2751) accomplished such condensations in an alkaline or acid medium. Einhorn (Ber. 41 27) accomplished the same condensations in the presence of baryta. The works of these authors have brought into evidence the unfavorable action of fixed alkalis in these sorts of reaction when it is a question of preparing synthetic plastic materials.

Other authors have utilized basic organic compounds such as amines, pyridine, hexamethylenetetramine, and the like.

Others such as Ripper (English Patent No. 181,014 of May 30, 1922) have recognized the favorable action of the ammoniacal salts towards the acceleration of hardening of the above-named condensation products.

There was previously known a process based on the use of alkali-earth carbonates in general.

As will be seen from the short bibliography, above given, very divers compounds have, first of all, been the object of numerous works; but one is led to the conclusion that, in practice, the reagents employed must possess, for realizing a good condensation, a series of properties, which necessarily limits their number. Their action must have definite effects, be progressive, uniform and one must be able to control it at each instant. Finally the liquids obtained by condensation must be sufficiently stable without changing state for the operations such as agitation, filtration and the like which are resorted to during the different stages of preparation.

It is absolutely necessary, in fact, to be able to instigate at will, all modifications in state of the equilibrium of the medium, in a way to obtain uniformly and unquestionably, hard stable industrial materials susceptible of being worked and manufactured according to the needs.

It has been found that metal carbonates and oxides with the exception of alkali-metal and alkali-earth metal carbonates and oxides such as the zinc and lead carbonates and oxides or the like, constitute excellent condensation agents for obtaining the results above indicated and it is the employment of these agents which forms the object of the present invention.

The elimination of these reagents, after establishment of condensation, is very easily obtained by simple filtration of the liquors. The latter, when they are subjected to a slight modification of their initial pH by application of known methods, and when they are concentrated under reduced pressure at low temperature, give at will, hard, transparent or opaque products, colored or not.

The use of these sorts of metal carbonates and oxides constitutes a real industrial advancement. For example, there is a marked favorable influence on the facility with which the urea gums thus obtained are desiccated. It also renders more easy the incorporation of certain loading materials without there following any noticeable modifications in the quality of the final product. In a general way, the use of these agents reacts favorably on the properties of the urea gums, allows considerable extension of their aptitudes to new uses and increases the variety of technical applications which may be attributed to these products. These reagents allow therefore of obtaining plastic materials in a stable definite state, which are utilizable in practice and which may be presented in the most diverse forms.

Nevertheless it is well known that the presence of formaldehyde in free state is objectionable and lowers the quality of plastic materials resulting from the condensation of formaldehyde, or polymers thereof, with urea, thiourea or derived bodies thereof. This is also true when the presence of this formaldehyde is due to an excess in the quantity employed initially as well as when it has originated in the midst of the plastic material for some reason such as the influence of heat on the methylol containing derivatives.

When industrially preparing plastic materials derived from urea, it is therefore necessary to avoid the presence of an excess of formaldehyde, as well as to avoid the setting free thereof in the midst of the methylolated derivatives.

The first of the two disadvantages pointed out above is easy to avoid by choosing in suitable fashion the proportion employed.

The following typical example will enable one skilled in the art to understand how the invention may be carried out practically.

*Example.*—We dissolve 60 parts of urea in 250 and even 220 parts of a 30% aqueous solution of formaldehyde, we add 1 to 2 parts of zinc carbonate precipitated pure, and we raise this solution progressively up to boiling point. We filter and then modify by known means the pH of the liquor and evacuate in a vacuum at low temperature the colorless aqueous solution obtained. When the residue has attained the consistency of a sirupy mass, it is poured into molds in which masses are formed which become insoluble by maintaining them at a temperature from 50° to 60° C.

The properties and aspect which such products can acquire by introducing organic or mineral charging materials, of a colored nature or not, are of an infinite variety.

In the example above, the zinc carbonate can be replaced by lead carbonate, bismuth carbonate and the like. If it is replaced by colored metal carbonates such as copper carbonate, for example, the products obtained are naturally also colored. Finally a large number of carbonates of the sort above pointed out can be replaced by corresponding quantities of oxides of the same metals such as lead, zinc, titanium and the like.

As concerns the second difficulty, above pointed out, issuing from the liberation of formaldehyde from the methylol derivatives in the midst of the reaction taking place, this difficulty has before been avoided in the manufacture of plastic compounds obtained by other processes and it has been proven that in the case of the substances here considered, no trace of formaldehyde is liberated if temperature conditions favorable to their stability are employed, and if care is taken to add a certain quantity of urea to the methylol derivatives obtained by the process above described. It is known nevertheless that this quantity must remain limited if it is desired that the mass obtained conserve its transparent qualities.

Thiourea can also be substituted for the urea in such preparations without altering, much on the contrary, the transparency of the masses obtained and we can cause the urea or the thiourea to react cold on the solutions of methylols by operating under reacting conditions most favorable for the medium. We eliminate the methylols which are insoluble by filtration and concentrate at a low temperature in order to avoid the evolving of formaldehyde.

Other bodies than urea or thiourea are susceptible of fixing the formaldehyde remaining in excess or liberated during the course of the reactions of condensation above described or during concentration of the methylol syrups. Thus, it has been recognized that sulphuretted hydrogen or sulphides such as ammonium sulphides saturate the free formaldehyde by giving way to substances susceptible of intervening as components of the urea-formaldehyde condensation products or capable of imparting plastic properties thereto.

These sulphides are not mentioned as limiting and interesting results have been obtained by employing alkali-metal or alkali-earth metal sulfocyanides which also give, with formaldehyde, combinations having a resinoid character.

Owing to the use of the condensation agents that have been cited in the preceding description, it is possible to obtain, from the reaction of urea solutions with formaldehydes, liquors having a pH which is automatically fixed to a determined value, said value depending upon the nature of the agent employed. For instance, when zinc carbonate is used as a condensation agent, the pH of the final solution is nearer to 7 than in the case of lead carbonate being used as a condensation agent. Accordingly it is possible, through a judicious choice of the catalytic agent, to control to a certain extent the properties of the liquors obtained. One of the most important properties of the liquors obtained according to our invention is that they can be conserved for several months without undergoing any alteration. It results therefrom that it is possible to transform a given solution, quickly and easily (either by utilizing it in its natural state, or by concentrating it, or by modifying its pH) either into varnishes or syrups for impregnation (by modifying, for instance, the pH so as to increase the basicity of the liquor, by adding a base or a basic salt thereto) or into hard products capable of being readily molded (by modifying, for instance, the pH so as to increase the acidity of the liquor, by adding an acid or an acid salt thereto). As a matter of fact, it is possible, by varying the pH, to exert a remarkable action on the rapidity with which the reactions take place and the properties of the products obtained.

The hard masses obtained by the process, the object of the invention, possess a transparency having a limpidity and refracting property which are particularly remarkable and can be sawed, turned, bored, polished and in a word worked by all ordinary processes and the fact that they retain when desired metal salts allows according to the nature of the metal combined to vary the opalescent or cloudy effects which gives a costly aspect to the fragments or objects cut from the mass.

When carrying out the process without heating, i. e. without exceeding the normal temperature, we obtain a white powder.

This powder is in greater part formed of the compounds known as dimethylols or even monomethylols, that is of substances resulting from the combination of formaldehyde and urea.

The said powder does not contain trioxymethylene and in the mother liqueur from which it is issued, can be found only traces of formaldehyde and no urea.

This powder presents the characters of a mixture of methylols-urea, the constitution of which can be represented by various formulæ.

The weight of the powder corresponds exactly to the weight of the reagents used.

Furthermore, such white powders form aqueous solutions that are in all respects identical with those reaction masses which, when heated, yield syrups of the type above set forth.

These facts indicate the composition of the products according to our invention.

Having thus described our invention what we claim as new and desire to secure by Letters Patent is:

1. A process for condensing urea with formaldehyde to give a product adapted to be hardened upon application of heat, which process comprises approximately 60 parts of urea with 220-250 parts of a 30% aqueous formaldehyde solution in the presence of 1-2 parts of zinc carbonate as a condensation agent, heating the mixture to boiling, filtering to remove excess condensation agent, and evaporating the filtrate to a syrupy consistency in a vacuum at a temperature not exceeding 50° C.

2. A process for condensing urea with formaldehyde which comprises reacting approximately 60 parts of urea with an aqueous solution containing 66-75 parts of formaldehyde in the presence of a condensation agent from the group consisting of the oxides and carbonates of zinc, lead and bismuth, and then reacting the free formaldehyde remaining in the resulting reaction mixture with a sulfide from the group consisting of hydrogen sulfide and ammonium sulfide.

3. A process for condensing urea with formaldehyde to give a product adapted to be hardened upon application of heat, which process comprises heating urea with an aqueous solution of formaldehyde in the presence of an excess of zinc carbonate as a condensing agent to give a liquid condensation product of urea and formaldehyde, removing the excess zinc carbonate, and removing water from the condensation product until said product attains a syrupy consistency.

4. A process for condensing urea with formaldehyde to give a product adapted to be hardened upon application of heat, which process comprises reacting urea with an aqueous solution of formaldehyde in the presence of an excess of zinc carbonate as a condensing agent, the proportion of urea and formaldehyde being such as to leave an excess of formaldehyde, removing the excess zinc carbonate, reacting the free formaldehyde remaining in the reaction mixture with a sulphide from the group consisting of hydrogen sulphide and ammonium sulphide, and removing water from the reaction mixture until it attains a syrupy consistency.

JULIEN MALET.
RENÉ ARMENAULT.